3,309,326
PRODUCTION OF ELECTRICALLY CONDUCTING CARBON
Harry Lister Riley, Sparken Hill, Worksop, England, assignor to United Coke & Chemicals Company Limited, Yorkshire, England, a British company
No Drawing. Filed Feb. 18, 1964, Ser. No. 345,596
Claims priority, application Great Britain, Feb. 22, 1963, 7,390/63
17 Claims. (Cl. 252—503)

When a refractory conductor of electricity is required it is common to make its of carbon, and it is well known that the carbon should as far as possible be in the form of graphite, since the so-called black amorphous carbons are either poor conductors or non-conductors of electricity. These carbons are in fact micro-crystalline, and it is the small size of the crystallites with the numerous crystal boundaries and the presence of impurities which make them poor conductors. They can be converted into good conductors of electricity by thermal treatment which involves recrystallisation into graphite, but extremely high temperatures are required. Thus the carbon electrodes of arc furnaces used, for example, in the production of steel are made by mixing amorphous carbon and pitch together, slowly baking the mixture to about 1000° C. to drive off volatile constituents and carbonise the pitch, and then gradually raising the temperature to about 2600° C. to recrystallise the carbon as graphite. Because of the high temperature necessary, this process is very expensive and technically difficult, and the total time taken in practice is many days.

I have now made the striking discovery that the temperature of graphitization and the total time required can be very substantially reduced if metal of the iron group is distributed throughout a mass of amorphous carbon to be graphitized. The process appears to depend for its success on the formation of interstitial solutions of carbon in the metal and subsequent recrystallisation of the carbon from these solutions as graphite. The mechanism is probably similar to that in the formation of graphite in iron-carbon alloys such as cast iron, and therefore involves the formation of graphite nuclei which, once formed, grow rapidly.

I make use of this discovery by including metal of the iron group (iron, nickel and cobalt) in a coherent body which consists predominantly of an intimate mixture of this metal and amorphous carbon, and heating the body within the temperature range of 1300 to 1700° C. to graphitize the carbon.

Iron is the preferred metal. The graphitization no doubt depends on the formation of graphite nuclei, and it is well known that carbon dissolved in completely pure molten iron tends on solidification to be deposited as cementite ($Fe_3C$). In the production of grey cast iron the formation and growth of graphite nuclei are often promoted by impurities, and it is possible that impurities in the iron assist in the graphite nucleation. However this may be, I find that the speed of graphitization is increased and improved results are obtained if the constituents of the mixture also include a material known to be a promoter of graphitization in cast iron. Silicon is the promoter most frequently used to graphitize cast iron, and may be used in the present invention in the form of ferro-silicon with great advantage. When this is done, the iron in the ferro-silicon constitutes some, and may constitute all of the iron included in the mixture. Other known promoters of graphitization which may be used with iron as the graphitizing metal are nickel and traces of aluminium. Care should be taken that elements that promote carbide formation in cast iron, e.g. manganese and chormium, are absent, or at least are not present in amounts sufficient to retard or inhibit graphitization.

It is very surprising that the mechanism involved in the graphitization of a small amount of carbon in a large amount of iron operates in a mass of amorphous carbon containing a smaller amount of iron so as to allow the temperature of the graphitizing heating to be low. I find that the temperature of this heating may be no more than 1300° C. Preferably, however, it is higher than this, and is at least 1400° C., since the speed of graphitization increases with temperature. Account must be taken of the tendency of iron to volatilize at high temperature, since loss of iron by volatilization leads to increase in resistivity. Because of appreciable volatilization or iron, the temperature of graphitization is not, in general, higher than 1700° C. The range of 1400 to 1600° C. is very suitable. This low temperature contrasts extremely favourably with the temperature of about 2600° C. that is necessary in the previous processes.

Iron melts at 1535° C., and iron-carbon alloys melt at lower temperatures and are therefore molten at the graphitization temperature. Radiographic examination shows that at the graphitizing temperatures used the metal forms a thin film on the internal surface of the carbon.

It is surprising that on heating a porous body of carbon and a metal such as iron to a temperature at which the metal melts the molten metal does not drain from the body. I have, however, found by radiography that mixtures containing up to 45% iron powder can be graphitized by heating for prolonged periods up to 1600° C. with little or no agglomeration of the iron.

Not only can I thus avoid the drawbacks and costs attendant on the use of very high temperatures, but also I find that a higher degree of graphitization and substantially lower electrical resistivity can be obtained than in electrodes made by the conventional process. The degree of graphitization, and hence the electrical resistivity of the article, depend on the temperature and duration of the heating, on the initial form and particle size of the carbon and also on the particular metal used and its form and particle size. For a given coherent body, the degree of graphitization depends on the temperature and time of heating, so that heating at, say, 1600° C. for a short time gives the same degree of graphitization as heating at 1500° C. for a longer time. The comparatively low temperatures required in the invention enable gas-heated furnaces to be used for the graphitization step.

The amorphous carbon can be present in the mixture as coke, and the mixture may be formed into the coherent body by methods similar to thase that are conventional in the processes used hitherto. Thus, the mixture is preferably formed into a "green" compact under pressure, either in a mould or by extrusion. Even though considerable pressure may be exerted, it is necessary to incorporate a binder in the mixture to render the body coherent. Coal tar pitch is very suitable as a binder since it becomes carbonised to amorphous carbon on initial heating, and this is subsequently largely graphitized. The coke used may be derived from pitch, coal or petroleum oil, and may be granular coke commonly known as grist, or crushed scrap of green or baked compacts. A mixture of two or more forms of carbon may be used. For instance, some graphite powder or crushed scrap may be mixed with coke grist. Naturally the coke will contain occluded or chemically combined elements other than carbon, such as hydrogen, oxygen, nitrogen and sulphur, but the amount of these should be small.

To avoid loss of strength the body should contain little volatile matter when it is subjected to the graphitizing heating, and the "green" compact should be baked slowly to a temperautre at which practically all the volatile constituents are removed. When pitch is used, such slow baking is essential because pitch softens and decomposes at a fairly low temperature, and if violent decomposition is permitted the body will be disintegrated. Once the volatile constituents have been removed the temperature can be rapidly increased to effect the graphitization.

Other binders which may be used include tars and the thermosetting resins such as the phenol-formaldehyde resins. These will decompose on slow initial baking of the body before the graphitizing heating.

The metal and graphitizing promoter should be distributed as uniformly as possible throughout the mixture. Since the graphitization involves contact between the metal and the carbon, it is desirable that the particle size of the metal powder should be small so as to give a large interface for graphitizaiton. Powder in the size range of 2 to 60 microns serves admirably. The average particle size may be distinctly larger than this, but should not exceed 0.3 mm. On the other hand metal of molecular size, produced by the addition to the body of a metal salt which is subsequently decomposed by heating, gives no useful result.

The desirable size grading of the amorphous carbon depends largely on the size of the body and the final use of the graphitized product. When the particle size of coke grist is small, e.g. wholly or predominantly less than 150 microns, the intimate mixture may be made simply by mixing the grist, iron powder and powdered electrode pitch. When coarse grist is used, some or all of the metal with or without a promoter may be incorporated in the particles in a preliminary process. It is desirable that the metal should be present inside such coarse particles and in the binder.

As an example of the incorporation of metal in grist, pitch from either coal tar or petroleum oil may be mixed with finely divided iron or ferro-silicon or both and the mixture may be carbonized and then ground to grist. As another example, finely divided iron oxide and pulverized coal, with or without iron or ferro-silicon, may be mixed and carbonized in a reducing atmosphere (the oxide thereby being reduced), and again the resultant coke may be ground to grist which with binder pitch and with or without additional iron or ferro-silicon may be formed into the coherent body.

Ferro-silicon used to provide both the metal and the promoter in a mix with coke and pitch may advantageously be introduced either wholly as particles incorporated in the coke, or partly as such particles, the remainder then being distributed throughout the binder.

The speed of graphitization increases with the amount of both the metal and any promoter of graphitization. From economic considerations, however, it is necessary to compare the cost of the power necessary to carry on the graphitizing heating for a longer time against the cost of the increased amount of metal and promoter necessary if the time is to be shorter. The quantity of metal powder in the mixture should be at least 5% and is preferably distinctly more. (This percentage and all others in the present specification are by weight.) The limiting amount is that at which the molten metal tend to become the predominant phase of the coherent body. If this point is exceeded, the metal will agglomerate and ooze from the body. We find that to prevent any such escape of molten metal the amount of the carbon and binder in the body (at the green compact stage) should be at least 55% by weight, that is to say the initial body may contain from 55 to 95% amorphous carbon. During the baking volatile matter is given off, the amount of course varying with the proportion of the binder and the content of volatile matter in the amorphous carbon. There may also be some very slight further loss of volatile matter during the graphitization. Although the total loss may vary, it is about 10% on the average. It follows that the final product may contain about 50 to 94% carbon.

When ferro-silicon is used as a promoter of graphitization, the resistivity is progressively decreased as the content of ferro-silicon increases under identical conditions of manufacture, but of course the cost increases also, and it is economically desirable to make the carbon content as high as is consistent with the low resistivity required. The silicon content in the initial body may be as high as 25%, but preferably does not exceed 10%. In the final product the corresponding precentages are about 28% and 11%. The ferro-silicon is preferably a grade containing between 6 and 20% silicon.

Nickel may be used alone as the metal of the iron group in the invention, or it may be used alloyed with iron as an iron-rich alloy. In this case the nickel may be regarded as acting as a promoter.

Aluminium in amounts less than 0.1% is a promoter of graphitization in cast iron, and in such amounts may be included in the coherent body in the invention.

The electrical resistivity of an electrode for use in an arc furance should be as low as possible, that of exisiting commercial electrodes normally being between 800 and 1200 microohms per centimetre cube. We find that, if the body contains no graphitizing promoter, the resistivity can be reduced to 2000 microohms per centimetre cube, that is to say to a figure that is adequate for various purposes, in a period of from 20 to 30 hours at a graphitizing temperature of 1600° C., and to less than 1000 microohms centimetre cube if the graphitizing heating is continued for a longer period. If the body contains a graphitizing promoter these periods are substantially reduced.

The invention includes as novel products electrically conducting articles having a specific resistance not exceeding 2000 microohms per centimetre cube and composed predominantly of carbon and metal of the iron group, the carbon being wholly or mainly graphite and amounting to from 50 to 94% of the body by weight; and more specifically, arc-furnace electrodes having a specific resistance not exceeding 1200 microohms per centimetre cube and composed of iron, silicon and carbon, the carbon being wholly or mainly graphite and amounting to from 50 to 94% of the body by weight, and the silicon not exceeding 11%.

Some examples will now be given. Each of these examples relates to the production of a small electrode. In each case the starting materials were mixed by hand and then extruded hot through a heated die to produce a green compact. This was then baked up to 950° C., at the rate of temperature increase shown, in an atmosphere of nitrogen. Thereafter the baked product was graphitized in a resistance furnace in an atmosphere of nitrogen. The electrical resistivities, all expressed in microohms per centimetre cube, were determined at the end of the periods of hours from the attainment of the graphitizing temperature shown in each example.

The iron powder used was sponge iron powder of from 96.5 to 97.5% purity. The ferro-silicon used contained 15% silicon (except that in Example 6) and was of the kind described as "atomised." When marked "M" the size grading of the ferro-silicon was as follows—

M

Size in microns: Wt., percent
- 211–152 _____ 2.3
- 152–76 _____ 26.9
- 76–53 _____ 15.1
- 53–44 _____ 9.7
- <44 _____ 46.0

The pitch used as a binder was typically electrode pitch of 52.7% coking value. The grist used except when specially manufactured to incorporate metal, as in Examples 10 to 12, was petroleum grist of one or other of two size gradings A and B, as follows—

A

Size in microns: Wt., percent
- 1000–853 _____ 2
- 853–500 _____ 20
- 500–353 _____ 6
- 353–152 _____ 9
- 152–104 _____ 13
- 104–76 _____ 10
- 76–53 _____ 15
- 53–44 _____ 5
- <44 _____ 15
- Carbon black _____ 5

B

- 76.53 _____ 30.3
- 53–44 _____ 24.2
- <44 _____ 34.9
- Carbon black _____ 10.6

*Example 1*

This is an example of the use of iron powder without any promoter.

Size gradings:
- Coke grist _____ A
- Iron powder, microns _____ 20–60

Composition of mix: Wt., percent
- Coke grist _____ 57
- Iron powder _____ 20
- Electrode pitch _____ 23

Extrusion:
- Temperature, °C. _____ 120
- Pressure, p.s.i. _____ 2,000
- Rate, " per min. _____ 14

Baking:
- 6°/hr. to 950° C.
- Density of baked electrode _____ 1.9
- Resistivity _____ 4,800

Graphitization at 1600° C.:

| Time (hr.) (total) | 21 | 40 | 58 |
|---|---|---|---|
| Density | 1.82 | 1.74 | 1.74 |
| Resistivity | 2,710 | 1,900 | 1,030 |

*Example 2*

This shows the effect of increasing the amount of iron powder.

Size gradings:
- Coke grist _____ A
- Iron powder, microns _____ 44–53

Composition of mix: Wt., percent
- Coke grist _____ 47
- Iron powder _____ 30
- Electrode pitch _____ 23

Extrusion:
- Temperature, °C. _____ 86
- Pressure, p.s.i. _____ 1,200
- Rate, " per min. _____ 16

Baking:
- 8°/hr. to 950° C.
- Density _____ 2.10
- Resistivity _____ 6401

Graphitization at 1600° C.:

| Time (hr.) (total) | 14 | 34 | 54 | 63 |
|---|---|---|---|---|
| Density | 1.85 | 1.82 | 1.71 | 1.72 |
| Resistivity | 7,111 | 1,727 | 1,100 | 970 |

The next three examples show the use of increasing quantities of ferrosilicon.

*Example 3*

Size gradings:
- Coke grist _____ B
- Ferrosilicon _____ M

Composition of mix: Wt., percent
- Coke grist _____ 52
- Ferrosilicon _____ 20
- Electrode pitch _____ 28

Extrusion:
- Temperature, °C. _____ 125
- Pressure, p.s.i. _____ 8,400
- Rate, " per min. _____ 14

Baking:
- 15° C./hr. to 950° C.
- Density of baked electrode _____ 1.77
- Resistivity _____ 7,177

Graphitization at 1600° C.:

| Time (hr.) (total) | 20 | 40 |
|---|---|---|
| Density | 1.81 | 1.82 |
| Resistivity | 853 | 627 |

*Example 4*

Size gradings:
- Coke grist _____ B
- Ferrosilicon, microns _____ 2–38

Composition of mix: Wt., percent
- Coke grist _____ 42
- Ferrosilicon _____ 30
- Electrode pitch _____ 28

Extrusion:
- Temperature, °C. _____ 115
- Pressure, p.s.i. _____ 2,100
- Rate, " per min. _____ 18
- Density of green electrode _____ 2.06

Baking:
- 15°/hr. to 950° C.
- Resistivity of baked electrode _____ 6868
- Density _____ 1.84

Graphitization at 1600° C.:

| Time (hr.) (total) | 10 | 30 | 50 |
|---|---|---|---|
| Density | 1.85 | 1.85 | 1.83 |
| Resistivity | 811 | 591 | 559 |

*Example 5*

Size gradings:
- Coke grist _____ B
- Ferrosilicon, microns _____ 2–38

Composition of mix: Wt., percent
 Coke grist _____ 32
 Ferrosilicon _____ 40
 Electrode pitch _____ 28
Extrusion:
 Temperature, °C. _____ 100
 Pressure, p.s.i. _____ 4,200
 Rate, " per min. _____ 17
 Density of "green" electrode _____ 2.34
Baking:
 15°/hr. to 950° C.
 Resistivity of baked electrode _____ 7521
 Density _____ 2.34

Graphitization at 1600° C.:

| Time (hr.) (total) | 10 | 20 | 40 | 60 |
|---|---|---|---|---|
| Density | 2.14 | 2.13 | 2.11 | 2.05 |
| Resistivity | 584 | 463 | 415 | 453 |

When the proportion of ferrosilicon was increased to 50%, with 22% coke grist and 28% electrode pitch, a small amount of the ferrosilicon drained out of the electrode and formed globules on the surface.

*Example 6*

This is an example of the use of ferrosilicon containing 45% silicon.

Size gradings:
 Coke grist _____ B
 Ferrosilicon, microns _____ 2–38
Composition of mix: Wt., percent
 Coke grist _____ 42
 Ferrosilicon _____ 30
 Electrode pitch _____ 28
Extrusion:
 Temperature, °C. _____ 110
 Pressure, p.s.i. _____ 5250
 Rate, " per min. _____ 19
 Density of "green" electrode _____ 2.05
Baking:
 15°/hr. to 950° C.
 Resistivity of baked electrode _____ 7905
 Density _____ 1.84

Graphitization at 1600° C.:

| Time (hr.) (total) | 20 | 40 |
|---|---|---|
| Density | 1.81 | 1.81 |
| Resistivity | 715 | 549 |

The next three examples show the use of lower graphitizing temperatures.

*Example 7*

Size gradings:
 Coke grist _____ B
 Ferrosilicon _____ M
Composition of mix: Wt., percent
 Coke grist _____ 52
 Ferrosilicon _____ 20
 Electrode pitch _____ 28
Extrusion:
 Temperature, °C. _____ 120
 Pressure, p.s.i. _____ 7,700
 Rate, " per min. _____ 13
 Density of "green" electrode _____ 1.91
Baking:
 8°/hr. to 950° C.
 Resistivity of baked electrode _____ 7602
 Density _____ 1.74

Graphitization at 1500° C.:

| Time (hr.) (total) | 10 | 20 | 30 | 40 |
|---|---|---|---|---|
| Density | 1.76 | 1.8 | 1.78 | 1.77 |
| Resistivity | 2,073 | 1,332 | 1,164 | 1,030 |

*Example 8*

Size gradings:
 Coke grist _____ B
 Ferrosilicon, microns _____ 2–38
Composition of mix: Wt., percent
 Coke grist _____ 42
 Ferrosilicon _____ 30
 Electrode pitch _____ 28
Extrusion:
 Temperature, °C. _____ 115
 Pressure, p.s.i. _____ 2,100
 Rate, " per min. _____ 18
 Density of "green" electrode _____ 2.0
Baking:
 15°/hr. to 950° C.
 Resistivity of baked electrode _____ 8392
 Density _____ 1.87

Graphitization at 1400° C.:

| Time (hr.) (total) | 10 | 30 | 50 | 70 |
|---|---|---|---|---|
| Density | 1.88 | 1.87 | 1.9 | |
| Resistivity | 2,784 | 1,186 | 943 | 771 |

*Example 9*

The coke grist was made by carbonizing low ash coal (<104 microns) together with ferrosilicon powder (<44 microns) to 1000° C. Grist contained 20% ferrosilicon.

Size gradings:
 Coke grist _____ B
 Ferrosilicon, microns _____ 2–38
Composition of mix: Wt., percent
 Coke grist _____ 52
 Ferrosilicon _____ [1] 20
 Electrode pitch _____ 28

[1] Total ferrosilicon 30.4%.

Extrusion:
 Temperature, °C. _____ 110
 Pressure, p.s.i. _____ 4,550
 Rate, " per min. _____ 17
 Density of "green" electrode _____ 2.01
Baking:
 15°/hr. to 950° C.
 Resistivity of baked electrode _____ 10,118
 Density _____ 1.91

Graphitization at 1600° C.:

| Time (hr.) (total) | 10 | 20 | 40 |
|---|---|---|---|
| Density | 1.97 | 2.03 | 1.96 |
| Resistivity | 702 | 547 | 553 |

*Example 10*

In this case coal and iron oxide in the form of mill scale were carbonised together to produce coke grist containing particles of iron.

Mixture carbonised:
 Coal, percent _____ 60
 Mill scale, percent _____ 40
 Maximum temperature of carbonisation,
  °C. _____ 1000

Size grading of iron-containing grist:

| | Wt. percent |
|---|---|
| 76–53 | 30.3 |
| 53–44 | 24.2 |
| <44 | 34.9 |
| Carbon black | 10.6 |

Size grading of iron powder:
20–60μ

Composition of mix for extrusion:

| | Wt., percent |
|---|---|
| Iron-containing grist | [1] 47.7 |
| Iron powder | [2] 24.3 |
| Electrode pitch | 28.0 |

[1] Coke 28.0 parts; iron 19.7 parts.
[2] Total iron content 44.0%.

Extrusion:

| | |
|---|---|
| Temperature, °C. | 120 |
| Pressure, p.s.i. | 8,400 |
| Rate, " per min. | 13 |

Baking:
 Rate 4°/hr. to 950° C.
 Resistivity _____ 5097

Graphitization:
 Temperature, °C. _____ 1600

| Time (hr.): | Resistivity |
|---|---|
| 20 | 2,639 |
| 40 | 1,860 |
| 60 | 1,612 |

*Example 11*

Coke grist:
 Made by carbonizing a hard pitch mixed with iron powder. Iron content of grist 25.9%. Size grading of grist B.

Composition of mix for extrusion:

| | Wt., percent |
|---|---|
| Coke grist | 77 |
| Electrode pitch | 23 |

Extrusion:

| | |
|---|---|
| Temperature, °C. | 135 |
| Pressure, p.s.i. | 7,000 |
| Rate, " per min. | 16 |

Baking:
 Rate 8° per hour to 950° C.
 Resistivity _____ 7028

Graphitization:
 Temperature, °C. _____ 1600

| Time (hr.): | Resistivity |
|---|---|
| 18 | 2,253 |
| 27 | 1,667 |
| 38 | 1,468 |
| 49 | 1,440 |
| 58 | 1,263 |
| 66 | 1,158 |

I claim:

1. A method for producing an electrically conducing article composed substantially of graphitized carbon, comprising, forming a coherent body of an intimate mixture comprising carbon, a binder, and a metal in finely divided form, said metal being selected from the group consisting of iron, nickel and cobalt and being present in an amount capable of significantly lowering the temperature required for graphitization, but at least in more than 5% by weight of the initial mixture, and heating said coherent body at a temperature in the range of 1300° to 1700° for at least ten hours to substantially graphitize the carbon.

2. A method according to claim 1 in which carbon comprises from 50% to 94% of the initial mixture and wherein said metal is present in an amount of from 6% to 50% of the initial mixture.

3. A method according to claim 1 wherein said heating is continued until the specific resistance of the body is less than 2000 micro-ohms per cubic centimeter.

4. A method according to claim 1 wherein the mixture further contains ferrosilicon in finely divided form.

5. A method for producing an electrically conducting article comprising forming a coherent body of a mixture comprising carbon, a carbonaceous binder, and a metal in finely divided form and selected from the group consisting of iron, nickel and cobalt, said metal being present in an amount capable of significantly lowering the graphitization temperature, but in at least more than 5% of the initial mixture, baking said coherent body to drive off volatile ingredients, and heating said body at a temperature of from 1400° to 1700° C. for at least ten hours to substantially graphitize the carbon.

6. A method according to claim 5 wherein said electrically conducting article is an arc furnace electrode.

7. A method according to claim 5 wherein said metal is iron.

8. A method according to claim 5 wherein the binder is selected from the group consisting of coal tar pitch and petroleum pitch.

9. A method according to claim 5 wherein said body is heated until its specific resistance is less than 1200 micro-ohms per cubic centimeter.

10. A method according to claim 5 wherein the carbon is initially mainly in the form of coke.

11. A method according to claim 5 wherein said mixture further includes a graphitization promoter selected from the group consisting of silicon, ferrosilicon, nickel and aluminum.

12. A method according to claim 5 wherein said graphitization promoter is ferrosilicon.

13. A method according to claim 5 wherein said carbon and said binder total from 55% to 95% by weight of the initial mixture.

14. A method of producing an arc furnace electrode comprising forming into a coherent body an intimate mixture of coke, coal tar pitch as a binder and finely divided ferrosilicon, baking to drive off volatile constituents, followed by heating the baked body to a temperature in the range of from 1300° to 1700° C. to graphitize the carbon until the electrical resistivity does not exceed 1200 micro-ohms per cubic centimeter.

15. A method according to claim 14 in which some of the silicon is introduced into the mixture as particles incorporated in the coke.

16. A method for producing an electrically conducting article comprising mixing a binder selected from the group consisting of coal tar pitch and petroleum pitch with at least one material selected from the group consisting of finely divided iron and ferrosilicon, carbonizing the mixture, grinding the mixture to grist, forming an intimate mixture of the grist and binder pitch into a coherent body, baking the body to drive off volatile constituents and subsequently heating the body in the temperature range of from 1300° to 1700° C. to graphitize the carbon until the resistivity does not exceed 2000 micro-ohms per cubic centimeter.

17. A method of producing an electrically conducting article which comprises mixing pulverized coal with a material selected from the group consisting of finely divided iron, iron oxide and ferrosilicon, carbonizing the mixture, grinding the mixture to grist, forming a body from an intimate mixture of the grist and binder pitch, baking said body to drive off volatile constituents, and heating the body to a temperature in the range of from 1300° to 1700° C. to graphitize the carbon until the resistivity is below about 2000 micro-ohms per cubic centimeter.

(References on following page)

References Cited by the Examiner

UNITED STATES PATENTS

| | | | |
|---|---|---|---|
| 2,104,841 | 1/1938 | White | 106—56 X |
| 2,270,199 | 1/1942 | Thrune | 106—56 |
| 2,315,346 | 3/1943 | Mitchell | 264—29 X |
| 2,695,943 | 11/1954 | Cape et al. | 252—508 |
| 2,997,744 | 8/1961 | Stoddard et al. | 204—294 |
| 3,001,238 | 9/1961 | Goeddel et al. | 106—56 X |

FOREIGN PATENTS

| | | |
|---|---|---|
| 733,073 | 6/1955 | Great Britain. |

OTHER REFERENCES

Greiner et al.: "Alloys of Iron and Silicon," First Ed. (1933), p. 19.

LEON D. ROSDOL, *Primary Examiner.*

JULIUS GREENWALD, ALBERT T. MEYERS, SAMUEL H. BLECH, *Examiners.*

J. D. WELSH, *Assistant Examiner.*